(12) United States Patent
Polleri et al.

(10) Patent No.: US 11,811,925 B2
(45) Date of Patent: Nov. 7, 2023

(54) TECHNIQUES FOR THE SAFE SERIALIZATION OF THE PREDICTION PIPELINE

(71) Applicant: Oracle International Corporation, Redwood Shores, CA (US)

(72) Inventors: Alberto Polleri, London (GB); Sergio Aldea Lopez, London (GB); Marc Michiel Bron, London (GB); Dan David Golding, London (GB); Alexander Ioannides, London (GB); Maria del Rosario Mestre, London (GB); Hugo Alexandre Pereira Monteiro, London (GB); Oleg Gennadievich Shevelev, London (GB); Larissa Cristina Dos Santos Romualdo Suzuki, Wokingham (GB); Xiaoxue Zhao, London (GB); Matthew Charles Rowe, Milton Keynes (GB)

(73) Assignee: Oracle International Corporation, Redwood Shores, CA (US)

( * ) Notice: Subject to any disclaimer, the term of this patent is extended or adjusted under 35 U.S.C. 154(b) by 489 days.

(21) Appl. No.: 17/019,256

(22) Filed: Sep. 12, 2020

(65) Prior Publication Data
US 2021/0083855 A1 Mar. 18, 2021

Related U.S. Application Data

(60) Provisional application No. 62/900,537, filed on Sep. 14, 2019.

(51) Int. Cl.
*H04L 9/08* (2006.01)
*G06N 20/20* (2019.01)
(Continued)

(52) U.S. Cl.
CPC .............. *H04L 9/0894* (2013.01); *G06F 8/75* (2013.01); *G06F 8/77* (2013.01); *G06F 11/3003* (2013.01);
(Continued)

(58) Field of Classification Search
CPC ..... H04L 9/0894; H04L 9/088; H04L 9/3236; G06N 20/20; G06N 20/00; G06N 20/01;
(Continued)

(56) References Cited

U.S. PATENT DOCUMENTS 5,343,527 A   8/1994 Moore
5,699,507 A   12/1997 Goodnow, II et al.
(Continued)

FOREIGN PATENT DOCUMENTS

CN   101782976   7/2010
WO   2018111270   6/2018
(Continued)

OTHER PUBLICATIONS

U.S. Appl. No. 17/019,255, Notice of Allow ance dated Nov. 2, 2021, 9 pages.
(Continued)

*Primary Examiner* — Hee K Song
(74) *Attorney, Agent, or Firm* — Mughal Gaudry & Franklin PC (57) ABSTRACT

The present disclosure relates to systems and methods for a machine-learning platform for the safe serialization of a machine-learning application. Individual library components (e.g., a pipeline, a microservice routine, a software module, and an infrastructure model) can be encrypted using one or more keys. The keys can be stored in a location different from the storage location of the machine-learning application. Prior to incorporation of the library component into a machine-learning model, one or more keys can be
(Continued)

retrieved from the remote storage location to authenticate that the one or more encrypted library components are authentic. The process can reject any of the one or more component, when the encrypted library component fails authentication. If a component is rejected, the system can roll back to a previous, authenticated version of the library component. The authenticated library components can be compiled into machine-learning software.

20 Claims, 5 Drawing Sheets

(51) Int. Cl.
| | |
|---|---|
| *G06F 16/36* | (2019.01) |
| *G06N 20/00* | (2019.01) |
| *G06F 16/901* | (2019.01) |
| *G06F 11/34* | (2006.01) |
| *G06F 16/907* | (2019.01) |
| *G06F 16/9035* | (2019.01) |
| *G06F 8/75* | (2018.01) |
| *G06F 8/77* | (2018.01) |
| *G06N 5/025* | (2023.01) |
| *G06F 16/28* | (2019.01) |
| *G06F 16/21* | (2019.01) |
| *G06F 16/2457* | (2019.01) |
| *H04L 9/32* | (2006.01) |
| *G06F 16/23* | (2019.01) |
| *G06F 11/30* | (2006.01) |
| *G06F 18/10* | (2023.01) |
| *G06F 18/213* | (2023.01) |
| *G06F 18/2115* | (2023.01) |
| *G06F 18/214* | (2023.01) |
| *G06N 5/01* | (2023.01) |

(52) U.S. Cl.
CPC ...... *G06F 11/3409* (2013.01); *G06F 11/3433* (2013.01); *G06F 11/3452* (2013.01); *G06F 11/3466* (2013.01); *G06F 16/211* (2019.01); *G06F 16/2365* (2019.01); *G06F 16/24573* (2019.01); *G06F 16/24578* (2019.01); *G06F 16/285* (2019.01); *G06F 16/367* (2019.01); *G06F 16/907* (2019.01); *G06F 16/9024* (2019.01); *G06F 16/9035* (2019.01); *G06F 18/10* (2023.01); *G06F 18/213* (2023.01); *G06F 18/2115* (2023.01); *G06F 18/2155* (2023.01); *G06N 5/01* (2023.01); *G06N 5/025* (2013.01); *G06N 20/00* (2019.01); *G06N 20/20* (2019.01); *H04L 9/088* (2013.01); *H04L 9/3236* (2013.01)

(58) Field of Classification Search
CPC ........ G06N 5/01; G06N 5/025; G06F 16/211; G06F 16/24573; G06F 16/907; G06F 16/285; G06F 16/367; G06F 16/9035; G06F 16/2365; G06F 16/24578; G06F 16/9024; G06F 8/75; G06F 8/77; G06F 11/3033; G06F 11/3466; G06F 11/3452; G06F 11/3409; G06K 9/6232
See application file for complete search history.

(56) References Cited

U.S. PATENT DOCUMENTS

| | | | |
|---|---|---|---|
| 9,306,738 | B2 | 4/2016 | Loftus et al. |
| 9,384,450 | B1 | 7/2016 | Cordes et al. |
| 10,198,399 | B1 | 2/2019 | Fritchman et al. |
| 10,417,577 | B2 | 9/2019 | Bowers et al. |
| 10,657,447 | B1 | 5/2020 | McDonnell et al. |
| 10,911,407 | B1* | 2/2021 | Warburton .......... H04L 63/0245 |
| 11,062,217 | B1* | 7/2021 | Kapoor ................. G06F 16/907 |
| 11,238,377 | B2 | 2/2022 | Polleri et al. |
| 11,429,893 | B1* | 8/2022 | Tong ..................... G06N 20/00 |
| 2004/0006761 | A1 | 1/2004 | Anand et al. |
| 2005/0102227 | A1 | 5/2005 | Solonchev |
| 2007/0043734 | A1 | 2/2007 | Cannon et al. |
| 2007/0239630 | A1 | 10/2007 | Davis et al. |
| 2009/0144698 | A1 | 6/2009 | Fanning et al. |
| 2011/0099532 | A1 | 4/2011 | Coldicott et al. |
| 2014/0180738 | A1 | 6/2014 | Phillipps et al. |
| 2015/0170053 | A1 | 6/2015 | Miao |
| 2015/0172321 | A1* | 6/2015 | Kirti ................... H04L 63/1425 726/1 |
| 2016/0055426 | A1 | 2/2016 | Aminzadeh et al. |
| 2016/0110657 | A1 | 4/2016 | Gibiansky et al. |
| 2016/0179063 | A1 | 6/2016 | De Baynast De Septfontaines et al. |
| 2016/0358099 | A1 | 12/2016 | Sturlaugson et al. |
| 2017/0061021 | A1 | 3/2017 | Royzner |
| 2017/0277693 | A1 | 9/2017 | Mehedy et al. |
| 2018/0052824 | A1 | 2/2018 | Ferrydiansyah et al. |
| 2018/0089593 | A1 | 3/2018 | Patel et al. |
| 2018/0314250 | A1 | 11/2018 | Lewis et al. |
| 2018/0314926 | A1 | 11/2018 | Schwartz et al. |
| 2018/0314936 | A1 | 11/2018 | Barik et al. |
| 2018/0322365 | A1 | 11/2018 | Yehezkel Rohekar |
| 2018/0322387 | A1 | 11/2018 | Sridharan et al. |
| 2018/0322403 | A1 | 11/2018 | Ron et al. |
| 2018/0222776 | A1 | 12/2018 | MacCartney et al. |
| 2018/0349447 | A1 | 12/2018 | Maccartney et al. |
| 2018/0349499 | A1 | 12/2018 | Pawar et al. |
| 2019/0108417 | A1 | 4/2019 | Talagala et al. |
| 2019/0163758 | A1 | 5/2019 | Zhivotvorev et al. |
| 2019/0228261 | A1 | 7/2019 | Chan |
| 2019/0279114 | A1 | 9/2019 | Deshpande et al. |
| 2019/0317805 | A1 | 10/2019 | Metsch et al. |
| 2019/0334716 | A1 | 10/2019 | Kocsis et al. |
| 2020/0081899 | A1 | 3/2020 | Shapur et al. |
| 2020/0082270 | A1* | 3/2020 | Gu ........................ G06N 5/045 |
| 2020/0333772 | A1 | 10/2020 | Srivastava et al. |
| 2020/0410011 | A1 | 12/2020 | Shi et al. |
| 2021/0081720 | A1 | 3/2021 | Polleri et al. |
| 2021/0081819 | A1 | 3/2021 | Polleri et al. |
| 2021/0081837 | A1 | 3/2021 | Polleri et al. |
| 2021/0117859 | A1* | 4/2021 | Rogers ................... G06N 3/045 |
| 2021/0133670 | A1 | 5/2021 | Cella et al. |
| 2021/0174217 | A1 | 6/2021 | Pai et al. |
| 2021/0250305 | A1 | 8/2021 | Santo |
| 2021/0358601 | A1 | 11/2021 | Pillai et al. |
| 2021/0383187 | A1* | 12/2021 | Kalyan ................... H04L 41/16 |
| 2022/0019663 | A1* | 1/2022 | Stapleton ............... H04L 9/008 |

FOREIGN PATENT DOCUMENTS

| | | |
|---|---|---|
| WO | 2018217635 | 11/2018 |
| WO | 2018222776 | 12/2018 |
| WO | 2019236894 | 12/2019 |

OTHER PUBLICATIONS

U.S. Appl. No. 16/893,073, Non-Final Office Action dated Dec. 20, 2021, 13 pages.
U.S. Appl. No. 16/892,724, Non-Final Office Action dated May 5, 2022, 12 pages.
U.S. Appl. No. 16/892,935, First Action Interview Pilot Program Pre-Interview Communication dated Aug. 12, 2022, 4 pages.
U.S. Appl. No. 16/893,189, Non-Final Office Action dated Aug. 2, 2022, 8 pages.
U.S. Appl. No. 16/893,193, First Action Interview Pilot Program Pre-Interview Communication dated Jun. 8, 2022, 6 pages.
U.S. Appl. No. 16/892,724, Notice of Allowance dated Aug. 26, 2022, 8 pages.
Amazon SageMaker, Available Online at https://aws.amazon.com/sagemaker/, Accessed from Internet on: Sep. 17, 2020, 13 pages.

(56) References Cited

OTHER PUBLICATIONS

AutoKeras, Available Online at https://autokeras.com/, Accessed from Internet on: Sep. 17, 2020, 3 pages.
Cloud AutoML, Google Cloud, Available Online at https://cloud.google.com/automl/, Accessed from Internet on: Sep. 17, 2020, 3 pages.
Datarobot Flagship Product, "Empowering the Human Heroes of the Intelligence Revolution", Robot, Available Online at https://www.datarobot.com/, 2020, 7 pages.
File Encryption and Decryption Using Python, Eduonix Blog, Available Online at https://blog.eduonix.com/software-development/file-encryption-decryption-using-python/, Nov. 8, 2018, 11 pages.
H20 Driverless AI, Open Source Leader in AI and ML, Available Online at https://www.h2o.ai/products/h2o-driverless-ai/, Accessed from Internet on: Sep. 17, 2020, 12 pages.
Home—Welcome to MIbox's Official Documentation, MLBox, Machine Learning Box Available Online at https://mlbox.readthedocs.io/en/latest/, Accessed from Internet on: Sep. 17, 2020, 2 pages.
Overview of Kubeflow Pipelines, Kubeflow, Available Online at https://www.kubeflow.org/docs/pipelines/overview/pipelines-overview/, last modified Mar. 8, 2020, Accessed from Internet on: Sep. 17, 2020, 7 pages.
PurePredictive, Available Online at https://www.purepredictive.com/, Accessed from Internet on: Sep. 17, 2020, 3 pages.
SecML: A Library for Secure and Explainable Machine Learning, Released Aug. 6, 2020, Available Online at https://pypi.org/project/secml/, 8 pages.
Set Up Authentication for Azure Machine Learning Resources and Workflows, Azure Machine Learning | Microsoft Docs, Available Online at https://docs.microsoft.com/en-us/azure/machine-learning/how-to-setup-authentication, Jun. 17, 2020, 13 pages.
Tensor flow, The TFX User Guide, Available Online at https://www.tensorflow.org/tfx/guide, Accessed from Internet on: Sep. 17, 2020, 17 pages.
The ModelValidator TFX Pipeline Component (Deprecated), TensorFlow, Last updated Jul. 8, 2020, Available Online at https://www.tensorflow.org/tfx/guide/modelval, Accessed from Internet on: Sep. 17, 2020, 2 pages.
TPOT Automated Machine Learning in Python, Available Online at http://epistasislab.github.io/tpot/, 3 pages.
Track Model Metrics and Deploy ML Models with MLflow and Azure Machine Learning (Preview), Microsoft Docs, Available Online at https://docs.microsoft.com/en-us/azure/machine-learning/how-to-use-mlflow, Jun. 4, 2020, 13 pages.
TransmogrifAI, Atomated machine learning for structured data, salesforce, Available Online at https://transmogrif.ai/, Accessed from Internet on: Sep. 17, 2020, 4 pages.
Using TPOT, Available Online at http://epistasislab.github.io/tpot/using/#crashfreeze-issue-with-n_jobs-1-under-osx-or-linux, 10 pages.
Waymo: Automated Model Selection for Self-Driving Vehicles, Available Online at https://waymo.com/, Accessed from Internet on: Sep. 17, 2020, 5 pages.
What is Automated Machine Learning (AutoML)?, Microsoft Docs, Available Online at https://docs.microsoft.com/en-us/azure/machine-learning/concept-automated-ml, Apr. 22, 2020, 13 pages.
Xpanse AI, The power of AI at the click of a button. Automated Data Science, Available Online at https://xpanse.ai/, Accessed from Internet on: Sep. 17, 2020, 4 pages.
Abrams, Machine Learning Model Pipelines: Part I, Hacker Noon, Available Online at https://hackernoon.com/machine-learning-model-pipelines-part-i-e138b7a7c1ef, Aug. 29, 2018, 10 pages.
Altunay et al., Generate Machine Learning Model Pipelines to Choose the Best Model for Your Problem, AutoAI, IBM Developer, Available Online at https://developer.ibm.com/tutorials/generate-machine-learning-model-pipelines-to-choose-the-best-model-for-your-problem-autoai/, Aug. 19, 2019, 11 pages.
Gordon, AI & Security Innovations Help Developers Preserve Privacy While Delivering Insight, Available Online at https://software.intel.com/content/www/us/en/develop/articles/ai-security-innovations-help-developers-preserve-privacy-while-delivering-insight.html, Jun. 18, 2019, 6 pages.
Jarmul; Katharine, "Privacy Attacks on Machine Learning Models", Virtual Event, InfoQLive: Delivering Technology Through Software Engineering Leadership, Sep. 23, 2020. Available Online at https://www.infoq.com/articles/privacy-attacks-machine-learning-models/, Accessed from Internet on: Sep. 16, 2020, 7 pages.
Lariffle, OpenMined/PySyft, GitHub—OpenMined/PySyft: A library for answering questions using data you cannot see, Available Online at https://github.com/OpenMined/PySyft, Accessed from Internet on: Sep. 16, 2020, 7 pages.
Lokuciejewski et al., Automatic Selection of Machine Learning Models for Compiler Heuristic Generation, Available Online at https://www.semanticscholar.org/paper/Automatic-Selection-of-Machine-Learning-Models-for-Lokuciejewski-Stolpe/5f4d110827f0e43eec77f6b78f02acd8550cc8b9?p2df, 2013, 15 pages.
Luo, A Review of Automatic Selection Methods for Machine Learning Algorithms and Hyper-Parameter Values, Network Modeling Analysis in Health Informatics and Bioinformatics, vol. 5, No. 18, May 23, 2016, pp. 1-16.
Mohr et al., Towards the Automated Composition of Machine Learning Services, 2018 IEEE International Conference on Services Computing (SCC), 2018, pp. 241-244.
Neustadter, Why AI Needs Security, Available Online at https://www.synopsys.com/designware-ip/technical-bulletin/why-ai-needs-security-dwtb-q318.html, Accessed from Internet on: Sep. 16, 2020, 9 pages.
Pathak, TPOT in Python, DataCamp, Available Online at https://www.datacamp.com/community/tutorials/tpot-machine-learning-python, Sep. 21, 2018, 18 pages.
Sparks et al., KeystoneML: Optimizing Pipelines for Large-Scale Advanced Analytics, 2017 IEEE 33rd International Conference on Data Engineering (ICDE), Apr. 2017, pp. 1-15.
Xu et al., CryptoNN: Training Neural Networks over Encrypted Data, Available Online at http://www.lichao.work/files/2019-C-ICDCS.pdf, Apr. 15, 2019, 11 pages.
Zoller et al., Benchmark and Survey of Automated Machine Learning Frameworks, Journal of Artificial Intelligence Research 1, 1993, pp. 1-65.
Sacha, et al., VIS4ML: An Ontology for Visual Analytics Assisted Machine Learning, IEEE Transactions on Visualization and Computer Graphics, vol. 25, No. 1, pp. 385-395, Jan. 1, 2019.
International Application No. PCT/US2020/049429, International Search Report and Written Opinion dated Nov. 27, 2020, 14 pages.
International Application No. PCT/US2020/049500, International Search dated Nov. 27, 2020, 11 pages.
International Application No. PCT/US2020/050600, International Search Report and Written Opinion dated Nov. 27, 2020, 13 pages.
Notice of Allowance for U.S. Appl. No. 18/100,458, dated Aug. 9, 2023.

* cited by examiner

TECHNIQUES FOR THE SAFE SERIALIZATION OF THE PREDICTION PIPELINE

CROSS-REFERENCE TO RELATED APPLICATIONS

This application claims priority of U.S. Provisional Patent Application No. 62/900,537 filed Sep. 14, 2019, entitled "AUTOMATED MACHINE-LEARNING SYSTEMS AND METHODS", which is hereby incorporated by reference in its entirety and for all purposes.

FIELD

The present disclosure relates to systems and techniques for machine learning. More particularly, the present disclosure relates to systems and techniques for generating and managing a library of machine-learning applications.

BACKGROUND

Machine-learning has a wide range of applications, such as search engines, medical diagnosis, text and handwriting recognition, image processing and recognition, load forecasting, marketing and sales diagnosis, chatbots, autonomous driving, and the like. Various types and versions of machine-learning models may be generated for similar applications using training data based on different technologies, languages, libraries, and the like, and thus may lack interoperability. In addition, different models may have different performances in different contexts and/or for different types of input data. Data scientists may not have the programming skills to generate the code necessary to build custom machine-learning models. In addition, available machine-learning tools do not store the various machine-learning model components as part of a library to allow for efficient reuse of routines in other machine-learning models.

Existing machine-learning applications can require considerable programming knowledge by a data scientist to design and construct a machine-learning application to solve specific problems. Intuitive interfaces can assist the data scientist construct a machine-learning application through a series of queries.

Some organizations can store data from multiple clients or suppliers with customizable schemas. These customizable schemas may not match standardized data storage schemas used by existing machine-learning models. Therefore, these other systems would need to perform a reconciliation process prior to using the stored data. The reconciliation process can be either a manual process or through a tedious extract, transform, load automated process prior to using the data for generating machine-learning applications.

Library components can targeted for manipulation or incorporation of malicious code. As the library components can be used in multiple machine-learning applications, the introduction of malicious code can easily spread to multiple applications. The authentication of various library components prior to incorporation can be time consuming.

BRIEF SUMMARY

Certain aspects and features of the present disclosure relate to machine-learning platform that generates a library of components to generate machine-learning models and machine-learning applications. The machine-learning infrastructure system allows a user (i.e., a data scientist) to generate machine-learning applications without having detailed knowledge of the cloud-based network infrastructure or knowledge of how to generate code for building the model. The machine-learning platform can analyze the identified data and the user provided desired prediction and performance characteristics to select one or more library components and associated application-programming interface (API) to generate a machine-learning application. The machine-learning techniques can monitor and evaluate the outputs of the machine-learning model to allow for feedback and adjustments to the model. The machine-learning application can be trained, tested, and compiled for export as stand-alone executable code.

The machine-learning platform can generate and store one or more library components that can be used for other machine-learning applications. The machine-learning platform can allow users to generate a profile which allows the platform to make recommendations based on a user's historical preferences. The model creation engine can detect the number and type of infrastructure resources necessary to achieve the desired results within the desired performance criteria.

Individual library components (e.g., a pipeline, a microservice routine, a software module, and an infrastructure model) can be encrypted using one or more keys. The keys can be stored in a location different from the storage location of the machine-learning application. Prior to incorporation of the library component into a machine-learning model, one or more keys can be retrieved from the remote storage location to authenticate that the one or more encrypted library components are authentic. The process can reject any of the one or more component, when the encrypted library component fails authentication. If a component is rejected, the system can roll back to a previous, authenticated version of the library component. The authenticated library components can be compiled into machine-learning software.

According to some implementations, a method may include authorizing a tenant system to communicate with the server system. The method can include loading the machine-learning model associated with the tenant system. The method can include receiving data from the tenant system, wherein the data configures the machine-learning model; authenticating the data according to a key. The method can include discarding the data if the authentication fails; and applying the data to the machine-learning model if the authentication succeeds.

According to some implementations, a server system may include one or more memories storing instructions, and one or more processors, communicatively coupled to the one or more memories, wherein the one or more processors are configured to perform operations including: authorizing a tenant system to communicate with the server system; loading the machine-learning model associated with the tenant system. The operations can include receiving data from the tenant system, wherein the data configures the machine-learning model. The operations can include authenticating the data according to a key; discarding the data if the authentication fails. The operations can include applying the data to the machine-learning model if the authentication succeeds.

According to some implementations, a non-transitory computer-readable medium may store one or more instructions. The one or more instructions, when executed by one or more processors of a server system, may cause the one or more processors to perform operations including: authorizing a tenant system to communicate with a server system; loading the machine-learning model associated with the tenant system. The operations may include receiving data from the tenant system, wherein the data configures the machine-learning model; authenticating the data according to a key. The operations may include discarding the data if the authentication fails. The operations may include applying the data to the machine-learning model if the authentication succeeds.

According to some implementations, a method may include architecting a machine-learning model comprising a plurality of library components. The library components can include at least one of a pipeline, a microservice routine, a software module, and an infrastructure model. The method can include encrypting one or more of the plurality of library components using one or more keys. The method can include storing the one or more encrypted library components at a first location. The method can include retrieving the one or more encrypted library components from the first location. The method can include retrieving the one or more keys from a second location, wherein the second location is different from the first location, to authenticate that the one or more encrypted library components are authentic; rejecting any one of the one or more encrypted library component, when the one or more encrypted library components fails authentication; and compiling the authenticated library components into machine-learning software.

These and other embodiments are described in detail below. For example, other embodiments are directed to systems, devices, and computer readable media associated with methods described herein.

A better understanding of the nature and advantages of embodiments of the present disclosed may be gained with reference to the following detailed description and the accompanying drawings.

BRIEF DESCRIPTION OF THE DRAWINGS

The specification makes reference to the following appended figures, in which use of like reference numerals in different figures is intended to illustrate like or analogous components.

DETAILED DESCRIPTION

Certain embodiments of the present disclosure relate to systems, devices, computer-readable medium, and computer-implemented methods for implementing various techniques for machine learning. The machine-learning techniques can allow a user (i.e., a data scientist) to generate machine-learning applications without having detailed knowledge of the cloud-based network infrastructure or knowledge of how to generate code for building the model. The machine-learning platform can analyze the identified data and the user provided desired prediction and performance characteristics to select one or more library components and associated API to generate a machine-learning application.

The machine-learning techniques can employ a chatbot to indicate the location of data, select a type of machine-learning solution, display optimal solutions that best meet the constraints, and recommend the best environment to deploy the solution.

The techniques described herein can include a self-adjusting corporation-wide discovery and integration feature can review a client's data store, review the labels for the various data schema, and effectively map the client's data schema to classifications used by the machine-learning model. The various techniques can automatically select the features that are predictive for each individual use case (i.e., one client), effectively making a machine-learning solution client-agnostic for the application developer. A weighted list of common representations of each feature for a particular machine-learning solution can be generated and stored.

The techniques can utilize existing data ontologies for generating machine-learning solutions for a high-precision search of relevant services to compose pipelines with minimal human intervention. For data sets without existing ontologies, one or more ontologies be generated.

The techniques can employ an adaptive pipelining composition service to identify and incorporate or more new models into the machine-learning application. The machine-learning application with the new model can be tested off-line with the results being compared with ground truth data. If the machine-learning application with the new model outperforms the previously used model, the machine-learning application can be upgraded and auto-promoted to production.

I. Machine-Learning Infrastructure Platform

Figure 1:
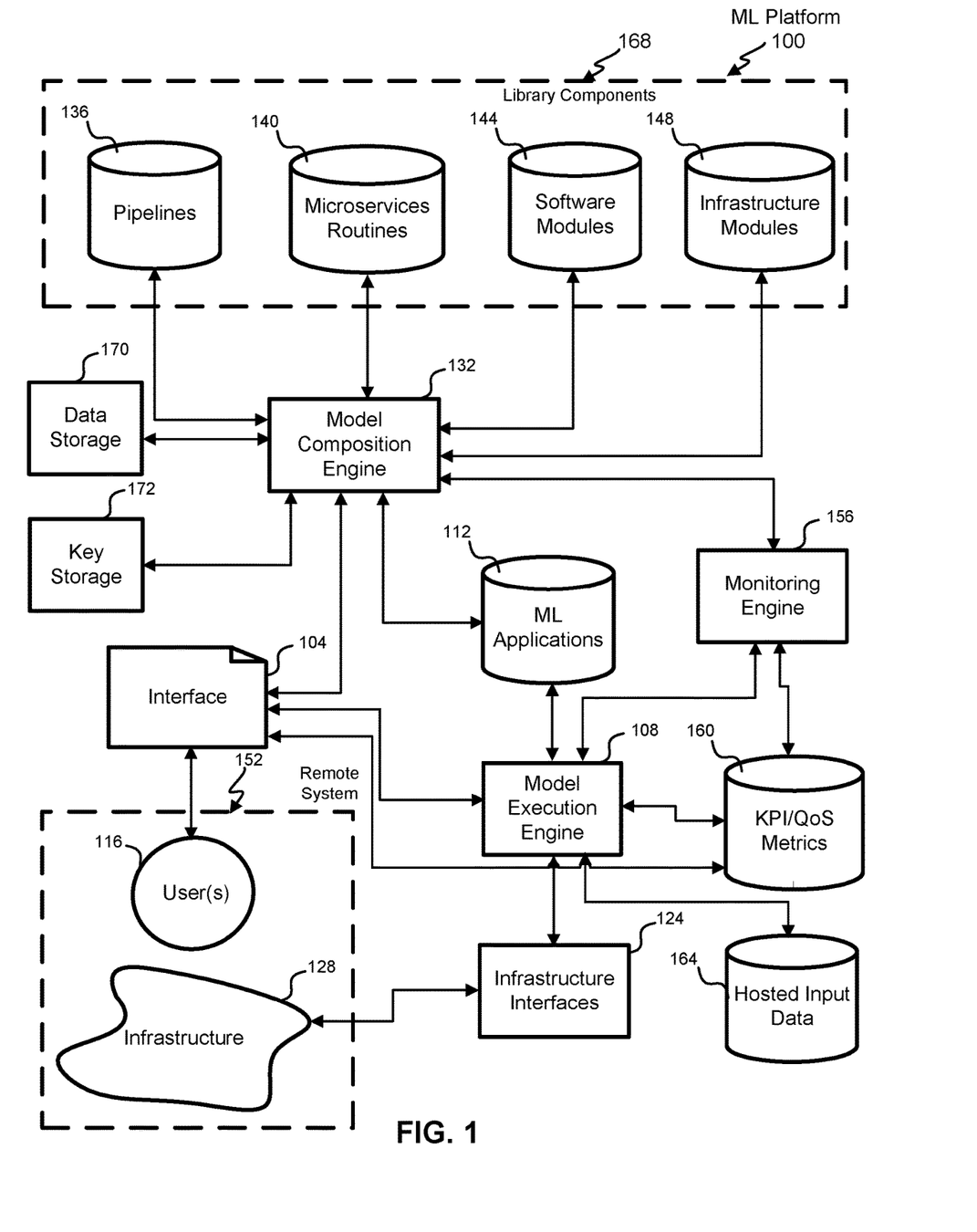
FIG. 1 is a block diagram illustrating an exemplary machine-learning infrastructure system.

FIG. 1 is a block diagram illustrating an exemplary machine-learning platform 100 for generating a machine-learning model. The machine-learning platform 100 has various components that can be distributed between different networks and computing systems. A machine-learning infrastructure library can store one or more components for generating machine-learning applications 112. All of the infrastructure required to productionize the machine-learning applications 112 can be encapsulated and stored in the library.

Machine-learning configuration and interaction with the model composition engine 132 allows for selection of various library components 168 (e.g., pipelines 136 or workflows 140, micro services routines 140, software modules 144, and infrastructure modules 148) to define implementation of the logic of training and inference to build machine-learning applications 112. Different parameters, variables, scaling, settings, etc. for the library components 168 can be specified or determined by the model composition engine 132. The complexity conventionally required to create the machine-learning applications 112 can be performed largely automatically with the model composition engine 132.

The library components 168 can be scalable to allows for the definition of multiple environments (e.g., different Kubernetes clusters) where the various portions of the application can be deployed to achieve any Quality of Service (QoS) or Key Performance Indicators (KPIs) specified. A Kubernetes cluster is a set of node machines for running containerized applications. The scalability can hide or abstract the complexity of the machine-learning platform 100 from the application developer. A monitoring engine 156 can monitor operation of the machine-learning applications 112 according to the KPI/QoS metrics 160 to assure the machine-learning application 112 is performing according to requirements. In addition the monitoring engine 156 can seamlessly test end-to-end a new or evolving machine-learning application at different scales, settings, loading, settings, etc. The monitoring engine 156 can recommend various adjustments to the machine-learning application 112 by signaling needed changes to the model composition engine 132.

To address scalability in some embodiments, the machine-learning platform 100 creates infrastructure, which is based on a micro services architecture, making it robust and scalable. For example, various micro services routines 140 and infrastructure modules 148 can be configured and customized for embedding into the machine-learning application 112. The machine-learning platform 100 can allow a developer to define the amount of resources (e.g. CPU, memory) needed for different library components 168 of the machine-learning application 112.

The machine-learning platform 100 can generate highly customizable applications. The library components 168 contain a set of predefined, off-the-shelf workflows or pipelines 136, which the application developer can incorporate into a new machine-learning application 112. A workflow specifies various micro services routines 140, software modules 144 and/or infrastructure modules 148 configured in a particular way for a type or class of problem. In addition to this, it is also possible to define new workflows or pipelines 136 by re-using the library components or changing an existing workflow or pipeline 136. The infrastructure modules 148 can also include services such as data gathering, process monitoring, and logging.

A model composition engine 132 can be executed on one or more computing systems (e.g., infrastructure 128). The model composition engine 132 can receive inputs from a user 116 through an interface 104. The interface 104 can include various graphical user interfaces with various menus and user selectable elements. The interface 104 can include a chatbot (e.g., a text based or voice based interface). The user 116 can interact with the interface 104 to identify one or more of: a location of data, a desired prediction of machine-learning application, and various performance metrics for the machine-learning model. The model composition engine 132 can interface with library components 168 to identify various pipelines 136, micro service routines 140, software modules 144, and infrastructure models 148 that can be used in the creation of the machine-learning model 112.

The model composition engine 132 can output one or more machine-learning applications 112. The machine-learning applications 112 can be stored locally on a server or in a cloud-based network. The model composition engine 132 can output the machine-learning application 112 as executable code that be run on various infrastructure 128 through the infrastructure interfaces 124.

The model execution engine 108 can execute the machine-learning application 112 on infrastructure 128 using one or more the infrastructure interfaces 124. The infrastructure 128 can include one or more processors, one or more memories, and one or more network interfaces, one or more buses and control lines that can be used to generate, test, compile, and deploy a machine-learning application 112. In various embodiments, the infrastructure 128 can exit on a remote system 152 that is apart from the location of the user 116. The infrastructure 128 can interact with the model execution engine 108 through the infrastructure interfaces 124 The model execution engine 108 can input the performance characteristics (e.g., KPI/QoS metrics storage 160) and the hosted input data 164. The model execution engine 108 can generate one or more results from the machine-learning application 112.

The KPI/QoS metrics storage 160 can store one or more metrics that can be used for evaluating the machine-learning application 112. The metrics can include inference query metrics, performance metrics, sentiment metrics, and testing metrics. The metrics can be received from a user 116 through a user interface 104.

The monitoring engine 156 can receive the results of the model execution engine 108 and compare the results with the performance characteristics (e.g., KPI/QoS metrics 160). The monitoring engine 156 can use ground truth data to test the machine-learning application 112 to ensure the model can perform as intended. The monitoring engine 156 can provide feedback to the model composition engine 132. The feedback can include adjustments to one or more variables or selected machine-learning model used in the machine-learning model 112.

The library components 168 can include various pipelines 136, micro service routines 140, software modules 144, and infrastructure modules 148. Software pipelines 136 can consist of a sequence of computing processes (e.g., commands, program runs, tasks, threads, procedures, etc.).

Micro services routines 140 can be used in an architectural approach to building applications. As an architectural framework, micro services are distributed and loosely coupled, to allow for changes to one aspect of an application without destroying the entire application. The benefit to using micro services is that development teams can rapidly build new components of applications to meet changing development requirements. Micro service architecture breaks an application down into its core functions. Each function is called a service, and can be built and deployed independently, meaning individual services can function (and fail) without negatively affecting the others. A micro service can be a core function of an application that runs independent of other services. By storing various micro service routines 140, the machine-learning platform 100 can generate a machine-learning application incrementally by identifying and selecting various different components from the library components 168.

Software modules 144 can include batches of code that form part of a program that contains one or more routines. One or more independently developed modules make up a program. An enterprise-level software application can contain several different software modules 144, and each module can serve unique and separate operations. A module interface can express the elements that are provided and required by the module. The elements defined in the interface can be detectable by other modules. The implementation can contain the working code that corresponds to the elements declared in the interface. Modular programming can be related to structured programming and object-oriented programming, all having the same goal of facilitating construction of large software programs and systems by decomposition into smaller pieces. While the historical usage of these terms has been inconsistent, "modular programming" as used herein refers to high-level decomposition of the code of an entire program into pieces: structured programming to the low-level code use of structured control flow, and object-oriented programming to the data use of objects, a kind of data structure. In object-oriented programming, the use of interfaces as an architectural pattern to construct modules is known as interface-based programming.

Infrastructure modules 148 can include the technology stack necessary to get machine-learning algorithms into production in a stable, scalable and reliable way. A technology stack can include set of software subsystems or components needed to create a complete platform such that no additional software is needed to support applications. For example, to develop a web application the architect defines the stack as the target operating system, web server, database, and programming language. Another version of a software stack is operating system, middleware, database, and applications. The components of a software stack can be developed by different developers independently from one another. The stack can extend from the data science tools used to select and train machine-learning algorithms down to the hardware those algorithms run on and the databases and message queues from which they draw the datasets.

The machine-learning platform 100 can include one or more data storage locations 170. The user can identify the one or more data storage locations 170. The data storage location 170 can be local (e.g., in a storage device electrically connected to the processing circuitry and interfaces used to generate, test, and execute the application). In various embodiments the data storage location 170 can be remote (e.g., accessible through a network such as a Local Area Network or the Internet). In some embodiments, the data storage location 170 can be a cloud-based server.

The data used for the machine-learning model 112 often includes personally identifiable information (PII), and thus, triggers certain safeguards provided by privacy laws. One way to protect the information contained in the data storage 170 can be to encrypt the data using one or more keys. Public-key cryptography, or asymmetric cryptography, is a cryptographic system that uses pairs of keys: public keys which may be disseminated widely, and private keys which are known only to the owner of the data. The private keys can be stored in the key storage 172 module to enable decrypting data for use by the machine-learning platform 100.

The model execution engine 108 can use hosted input data 164 to execute and test the machine-learning application 112. The hosted input data 164 can include a portion of the data stored at the data storage 170. In various embodiments, a portion of the hosted input data 164 can be identified as testing data.

II. Safe Serialization of the Predicted Pipeline (Including the Model)

Persisted machine-learning models can be typically implemented with executable code (e.g., Python Pickle). Executable code can be susceptible to security vulnerabilities such as malicious code injection. One problem can exist if the storage is compromised and bad agents can tamper the serialized machine-learning models through modification of various library components 168.

In various embodiments, the library components 168 can each be cryptographically signed when stored and/or for each instantiation of the pipeline 136 for the serialized machine-learning model. Each library component 168 could have a unique key for each component instance or shared for an instance of the machine-learning model. The private key can be stored in key storage 172 at a secure location separate from the library components 168. Access to the secure location can be authenticated and has authorization checks. Encryption and/or one-way hash functions can be used to detect tamper with the code. The decryption/encryption with the remotely stored key can be done for each library component 168 and optionally the machine-learning model itself. In this way, it is possible to detect whether malicious code gets into the library components 168 by comparing the saved signature with the new signature at the moment of loading the, any integration of the library component 168 into a machine-learning model or complied machine-learning application. Any kind of Python models (or the like) and steps in the pipeline or workflow could be signed or encrypted. Once a library component 168 or machine-learning model is customized for a given instantiation that can be encrypted or signed. The uncustomized library components can also be signed or encrypted so hacks do not infect multiple instantiations.

The present disclosure relates to systems and methods for a machine-learning platform for the safe serialization of a machine-learning application. Individual library components (e.g., a pipeline, a microservice routine, a software module, and an infrastructure model) can be encrypted using one or more keys. The keys can be stored in a location different from the storage location of the machine-learning application. Prior to incorporation of the library component into a machine-learning model, one or more keys can be retrieved from the remote storage location to authenticate that the one or more encrypted library components are authentic. The process can reject any of the one or more component, when the encrypted library component fails authentication. If a component is rejected, the system can roll back to a previous, authenticated version of the library component. The authenticated library components can be compiled into machine-learning software.

Figure 2:
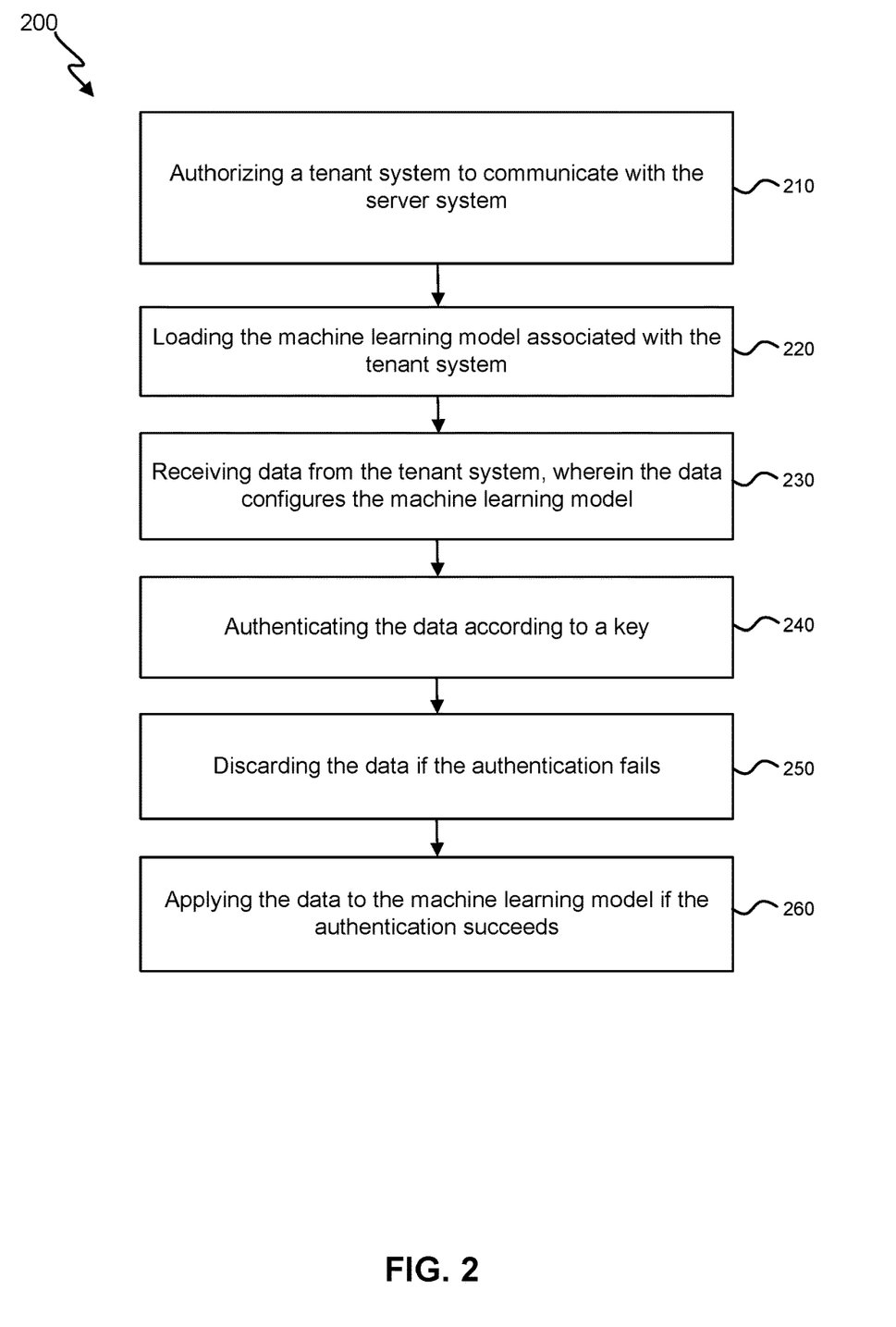
FIG. 2 illustrates an exemplary flow chart for the safe serialization of the prediction pipeline.

FIG. 2 is a flow chart of an example process 200 for the safe serialization of the prediction pipeline. In some implementations, one or more process blocks of FIG. 2 can be performed by a cloud-based server system. In some implementations, one or more process blocks of FIG. 2 can be performed by another device or a group of devices separate from or including the cloud-based server system. The safe serialization does not just apply to the entire model pipeline, but applies to various components, which may be share across different solutions (e.g., flattening elements, common transformation pipelines, etc.)

This process is handles transparently for the model user/creator/executor. This process is also independent from storage access credentials. If the storage access is compromised, this process will provide an additional layer of security that would avoid an intruder from compromising a library component.

This process also adds cryptographic security to pipelines. Only authorized agents can execute/load a model or parts of the pipeline. In shared environments, if storage protection (in cloud) is broken between tenants (customers), a tenant will not be able to execute another tenant's model, because the cryptographic key is stored independently.

Figure 5:
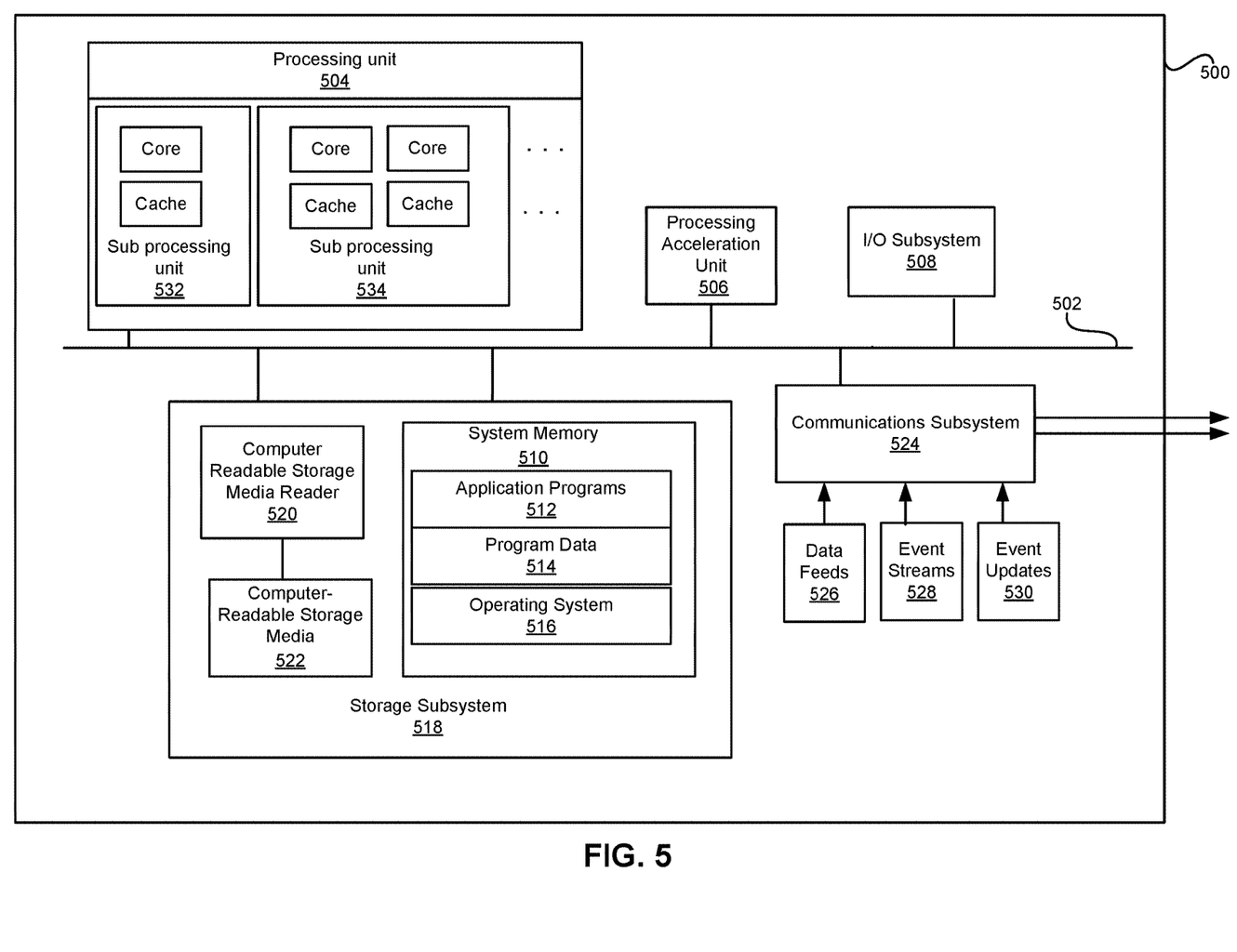
FIG. 5 illustrates an exemplary computer system, in which various embodiments of the present disclosure may be implemented.

At 210, process 200 can include authorizing a tenant system to communicate with the server system. For example, the cloud-based server system (e.g., using processing unit 504, system memory 510, storage subsystem 518, computer readable storage media reader 520, communications subsystem 524, and bus 502, and/or the like as illustrated in FIG. 5 and described below) can authorize a tenant system to communicate with the server system, as described above.

At 220, process 200 can include loading the machine-learning model associated with the tenant system. For example, the server system (e.g., using processing unit 504, system memory 510, storage subsystem 518, computer readable storage media reader 520, communications subsystem 524, and bus 502, and/or the like as illustrated in FIG. 5 and described below) can load the machine-learning model associated with the tenant system, as described above.

At 230, process 200 can include receiving data from the tenant system, wherein the data configures the machine-learning model. For example, the server system (e.g., using processing unit 504, system memory 510, storage subsystem 518, computer readable storage media reader 520, communications subsystem 524, and bus 502, and/or the like as illustrated in FIG. 5 and described below) can receive data from the tenant system, as described above. In some implementations, the data configures the machine-learning model.

At 240, process 200 can include authenticating the data according to a key. For example, the server system (e.g., using processing unit 504, system memory 510, storage subsystem 518, computer readable storage media reader 520, communications subsystem 524, and bus 502, and/or the like as illustrated in FIG. 5 and described below) can authenticate the data according to a key, as described above.

At 250, process 200 can include discarding the data if the authentication fails. For example, the server system (e.g., using processing unit 504, system memory 510, storage subsystem 518, computer readable storage media reader 520, communications subsystem 524, and bus 502, and/or the like as illustrated in FIG. 5 and described below) can discard the data if the authentication fails, as described above.

At 260, process 200 can include applying the data to the machine-learning model if the authentication succeeds. For example, the server system (e.g., using processing unit 504, system memory 510, storage subsystem 518, computer readable storage media reader 520, communications subsystem 524, and bus 502, and/or the like as illustrated in FIG. 5 and described below) can apply the data to the machine-learning model if the authentication succeeds, as described above.

Process 200 can include additional implementations, such as any single implementation or any combination of implementations described below and/or in connection with one or more other processes described elsewhere herein. It should be appreciated that the specific steps illustrated in FIG. 2 provide particular techniques for techniques for the safe serialization of the prediction pipeline according to various embodiments of the present disclosure. Other sequences of steps can also be performed according to alternative embodiments. For example, alternative embodiments of the present disclosure can perform the steps outlined above in a different order. Moreover, the individual steps illustrated in FIG. 2 can include multiple sub-steps that can be performed in various sequences as appropriate to the individual step. Furthermore, additional steps can be added or removed depending on the particular applications. One of ordinary skill in the art would recognize many variations, modifications, and alternatives.

In various embodiments, process 200 can include architecting a machine-learning model comprising a plurality of library components, wherein the library components comprise at least one of a pipeline, a microservice routine, a software module, and an infrastructure model. For example, the cloud-based server system (e.g., using processing unit 504, system memory 510, storage subsystem 518, computer readable storage media reader 520, communications subsystem 524, and bus 502, and/or the like as illustrated in FIG. 5 and described below) can architect a machine-learning model comprising a plurality of library components, as described above. In some implementations, the library components comprise at least one of a pipeline, a microservice routine, a software module, and an infrastructure model.

In some implementations, the data comprises one or more library components including at least one of a pipeline, a microservice routine, a software module, and an infrastructure model, the one or more library components is encrypted using the key.

A machine-learning pipeline can be used to help automate machine-learning workflows. They operate by enabling a sequence of data to be transformed and correlated together in a model that can be tested and evaluated to achieve an outcome, whether positive or negative. This process of tying together different pieces of the machine-learning process can be known as a pipeline.

Microservices are an architectural approach to building applications. As an architectural framework, microservices are distributed and loosely coupled, so one team's changes will not break the entire app. The benefit to using microservices is that development teams are able to rapidly build new components of apps to meet changing business needs. A microservice is a core function of an application and it runs independent of other services.

In software, a module is a part of a program. Programs are composed of one or more independently developed modules that are not combined until the program is linked. A single module can contain one or several routines.

An infrastructure module is a collection of resource modules, which can be logically not connected, but in the current situation/project/setup are serving the same purpose. It defines configuration for providers, which is passed to the downstream resource modules and to resources.

In various embodiments, process 200 can include encrypting one or more of the plurality of library components using one or more keys. For example, the cloud-based server system (e.g., using processing unit 504, system memory 510, storage subsystem 518, computer readable storage media reader 520, communications subsystem 524, and bus 502, and/or the like as illustrated in FIG. 5 and described below) can encrypt one or more of the plurality of library components using one or more keys, as described above. The encryption process can use a public/private key pair.

In various embodiments, process 200 can include storing the one or more encrypted library components at a first location. For example, the cloud-based server system (e.g., using processing unit 504, system memory 510, storage subsystem 518, computer readable storage media reader 520, communications subsystem 524, and bus 502, and/or the like as illustrated in FIG. 5 and described below) can store the one or more encrypted library components at a first location, as described above. The first location can be a storage location. The storage location can be accessible via a network (e.g., the Internet). In various embodiments, access to the storage location can be password protected.

In various embodiments, process 200 can include retrieving the one or more encrypted library components from the first location. For example, the cloud-based server system (e.g., using processing unit 504, system memory 510, storage subsystem 518, computer readable storage media reader 520, communications subsystem 524, and bus 502, and/or the like as illustrated in FIG. 5 and described below) can retrieve the one or more encrypted library components from the first location, as described above. The one or more encrypted library components can be stored in a local storage.

In various embodiments, process 200 can include retrieving the one or more keys from a second location, wherein the second location is different from the first location, to authenticate that the one or more encrypted library components are authentic. For example, the cloud-based server system (e.g., using processing unit 504, system memory 510, storage subsystem 518, computer readable storage media reader 520, communications subsystem 524, and bus 502, and/or the like as illustrated in FIG. 5 and described below) can retrieve the one or more keys from a second location, as described above. In some implementations, the second location is different from the first location, to authenticate that the one or more encrypted library components are authentic. The second location can be a storage location. The storage location can be accessible via a network (e.g., the Internet). In various embodiments, access to the storage location can be password protected.

In various embodiments, process 200 can include rejecting any one of the one or more encrypted library component, when the one or more encrypted library components fails authentication. For example, the cloud-based server system (e.g., using processing unit 504, system memory 510, storage subsystem 518, computer readable storage media reader 520, communications subsystem 524, and bus 502, and/or the like as illustrated in FIG. 5 and described below) can reject any one of the one or more encrypted library component, when the one or more encrypted library components fails authentication, as described above.

In various embodiments, the system can roll back to a previous, authenticated version of the library component when the one or more encrypted library component fails authentication.

In various embodiments, process 200 can include compiling the authenticated library components into machine-learning software. For example, the cloud-based server system (e.g., using processing unit 504, system memory 510, storage subsystem 518, computer readable storage media reader 520, communications subsystem 524, and bus 502, and/or the like as illustrated in FIG. 5 and described below) can compile the authenticated library components into machine-learning software, as described above.

In some implementations, the key for each library component of the one or more library components is unique.

In some implementations, the library components are stored at a first location, and the key is stored at a second location, the first location is different from the second location.

In some implementations, process 200 includes compiling the library components into machine-learning software; and encrypting the machine-learning software using a second set of encryption keys.

In some implementations, the key comprises a cryptographic hash function. The hash function for the library component can be calculated. The hash function value can be encrypted and stored. The library component can be authenticated by calculating the hash value of the library component and comparing the calculated hash value to the decrypted stored hash value.

In some implementations, process 200 can include encrypting the machine-learning software using a second set of encryption keys.

In some implementations, process 200 can include providing an alert to a user when the one or more encrypted library components fails authentication.

In some implementations, the data comprises an uncustomized library component, further comprising encrypting the uncustomized library component using the key.

In some implementations, process 200 can include quarantining the one or more library components which fail authentication.

Although FIG. 2 shows example steps of process 200, in some implementations, process 200 can include additional steps, fewer steps, different steps, or differently arranged steps than those depicted in FIG. 2. Additionally, or alternatively, two or more of the steps of process 200 can be performed in parallel.

In various embodiments, a server device can include one or more memories; and one or more processors in communication with the one or more memories and configured to execute instructions stored in the one or more memories to performing operations of a method described above.

In various embodiments, a computer-readable medium storing a plurality of instructions that, when executed by one or more processors of a computing device, cause the one or more processors to perform operations of any of the methods described above.

III. Exemplary Hardware and Software Configurations

Figure 3:
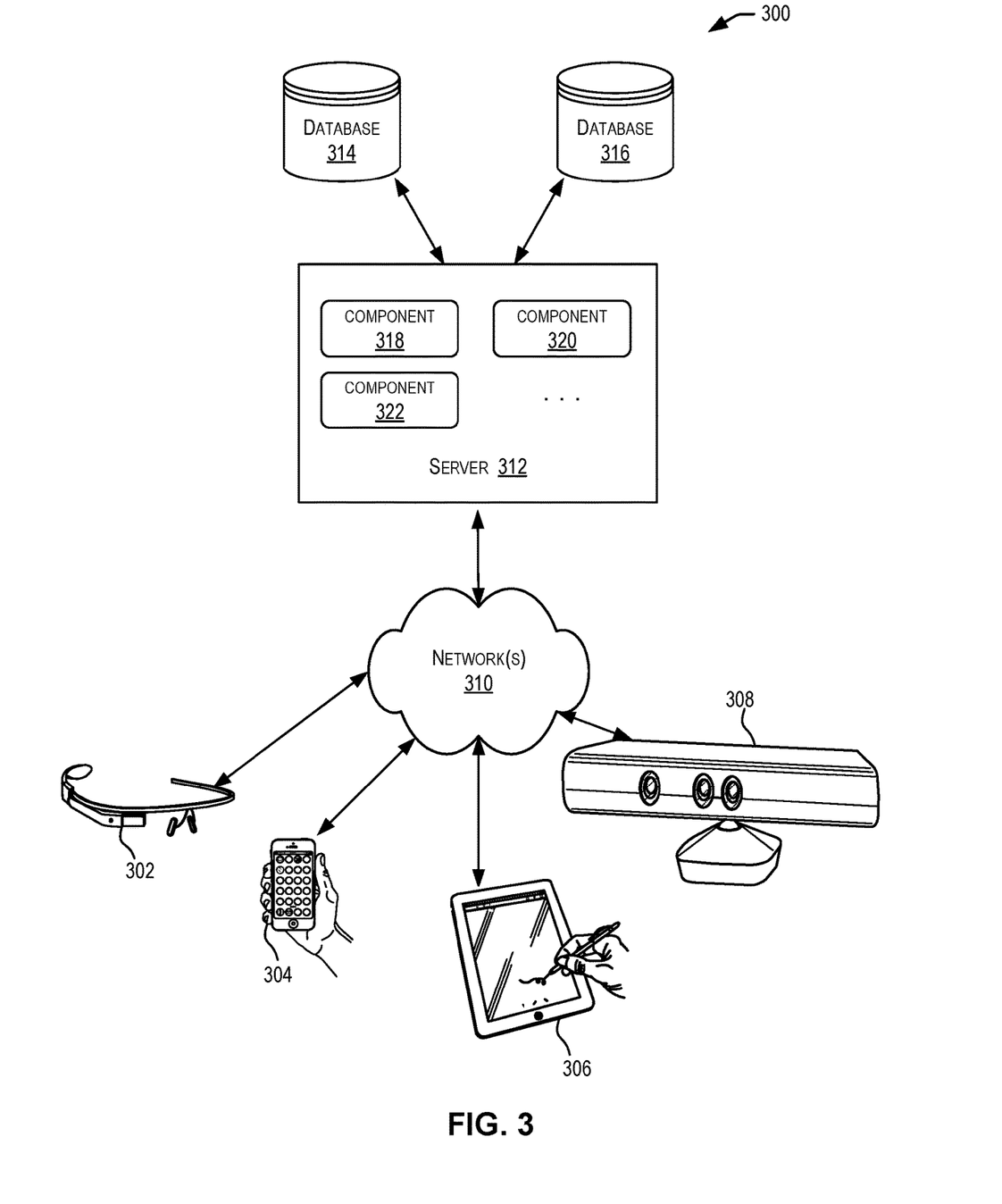
FIG. 3 is a simplified diagram illustrating a distributed system for implementing one of the embodiments.

FIG. 3 depicts a simplified diagram of a distributed system 300 for implementing one of the embodiments. In the illustrated embodiment, distributed system 300 includes one or more client computing devices 302, 304, 306, and 308, which are configured to execute and operate a client application such as a web browser, proprietary client (e.g., Oracle Forms), or the like over one or more network(s) 310. Server 312 may be communicatively coupled with remote client computing devices 302, 304, 306, and 308 via network 310.

In various embodiments, server 312 may be adapted to run one or more services or software applications provided by one or more of the components of the system. In some embodiments, these services may be offered as web-based or cloud services or under a Software as a Service (SaaS) model to the users of client computing devices 302, 304, 306, and/or 308. Users operating client-computing devices 302, 304, 306, and/or 308 may in turn utilize one or more client applications to interact with server 312 to utilize the services provided by these components.

In the configuration depicted in the figure, the software components 318, 320 and 322 of system 300 are shown as being implemented on server 312. In other embodiments, one or more of the components of system 300 and/or the services provided by these components may also be implemented by one or more of the client computing devices 302, 304, 306, and/or 308. Users operating the client computing devices may then utilize one or more client applications to use the services provided by these components. These components may be implemented in hardware, firmware, software, or combinations thereof. It should be appreciated that various different system configurations are possible, which may be different from distributed system 300. The embodiment shown in the figure is thus one example of a distributed system for implementing an embodiment system and is not intended to be limiting.

Client computing devices 302, 304, 306, and/or 308 may be portable handheld devices (e.g., an iPhone®, cellular telephone, an iPad®, computing tablet, a personal digital assistant (PDA)) or wearable devices (e.g., a Google Glass® head mounted display), running software such as Microsoft Windows Mobile®, and/or a variety of mobile operating systems such as iOS, Windows Phone, Android, BlackBerry 10, Palm OS, and the like, and being Internet, e-mail, short message service (SMS), Blackberry®, or other communication protocol enabled. The client computing devices can be general-purpose personal computers including, by way of example, personal computers and/or laptop computers running various versions of Microsoft Windows®, Apple Macintosh®, and/or Linux operating systems. The client computing devices can be workstation computers running any of a variety of commercially-available UNIX® or UNIX-like operating systems, including without limitation the variety of GNU/Linux operating systems, such as for example, Google Chrome OS. Alternatively, or in addition, client computing devices 302, 304, 306, and 308 may be any other electronic device, such as a thin-client computer, an Internet-enabled gaming system (e.g., a Microsoft Xbox gaming console with or without a Kinect® gesture input device), and/or a personal messaging device, capable of communicating over network(s) 310.

Although exemplary distributed system 300 is shown with four client computing devices, any number of client computing devices may be supported. Other devices, such as devices with sensors, etc., may interact with server 312.

Network(s) 310 in distributed system 300 may be any type of network familiar to those skilled in the art that can support data communications using any of a variety of commercially-available protocols, including without limitation TCP/IP (transmission control protocol/Internet protocol), SNA (systems network architecture), IPX (Internet packet exchange), AppleTalk, and the like. Merely by way of example, network(s) 310 can be a local area network (LAN), such as one based on Ethernet, Token-Ring and/or the like. Network(s) 310 can be a wide-area network and the Internet. It can include a virtual network, including without limitation a virtual private network (VPN), an intranet, an extranet, a public switched telephone network (PSTN), an infra-red network, a wireless network (e.g., a network operating under any of the Institute of Electrical and Electronics (IEEE) 802.11 suite of protocols, Bluetooth®, and/or any other wireless protocol); and/or any combination of these and/or other networks.

Server 312 may be composed of one or more general purpose computers, specialized server computers (including, by way of example, PC (personal computer) servers, UNIX® servers, mid-range servers, mainframe computers, rack-mounted servers, etc.), server farms, server clusters, or any other appropriate arrangement and/or combination. In various embodiments, server 312 may be adapted to run one or more services or software applications described in the foregoing disclosure. For example, server 312 may correspond to a server for performing processing described above according to an embodiment of the present disclosure.

Server 312 may run an operating system including any of those discussed above, as well as any commercially available server operating system. Server 312 may also run any of a variety of additional server applications and/or mid-tier applications, including HTTP (hypertext transport protocol) servers, FTP (file transfer protocol) servers, CGI (common gateway interface) servers, JAVA® servers, database servers, and the like. Exemplary database servers include without limitation those commercially available from Oracle, Microsoft, Sybase, IBM (International Business Machines), and the like.

In some implementations, server 312 may include one or more applications to analyze and consolidate data feeds and/or event updates received from users of client computing devices 302, 304, 306, and 308. As an example, data feeds and/or event updates may include, but are not limited to, Twitter® feeds, Facebook® updates or real-time updates received from one or more third party information sources and continuous data streams, which may include real-time events related to sensor data applications, financial tickers, network performance measuring tools (e.g., network monitoring and traffic management applications), clickstream analysis tools, automobile traffic monitoring, and the like. Server 312 may also include one or more applications to display the data feeds and/or real-time events via one or more display devices of client computing devices 302, 304, 306, and 308.

Distributed system 300 may also include one or more databases 314 and 316. Databases 314 and 316 may reside in a variety of locations. By way of example, one or more of databases 314 and 316 may reside on a non-transitory storage medium local to (and/or resident in) server 312. Alternatively, databases 314 and 316 may be remote from server 312 and in communication with server 312 via a network-based or dedicated connection. In one set of embodiments, databases 314 and 316 may reside in a storage-area network (SAN). Similarly, any necessary files for performing the functions attributed to server 312 may be stored locally on server 312 and/or remotely, as appropriate. In one set of embodiments, databases 314 and 316 may include relational databases, such as databases provided by Oracle, that are adapted to store, update, and retrieve data in response to SQL-formatted commands.

Figure 4:
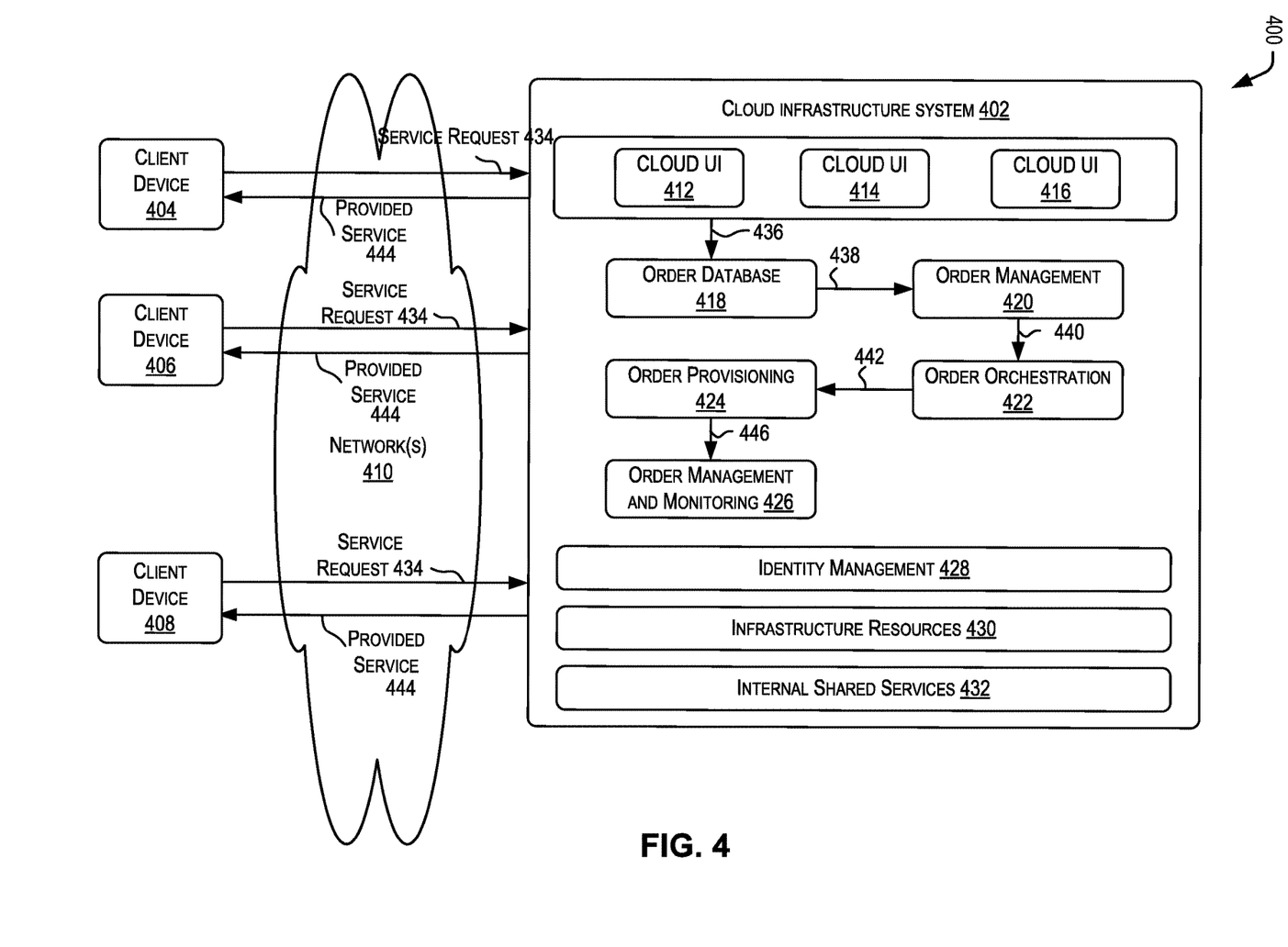
FIG. 4 is a simplified block diagram illustrating one or more components of a system environment.

FIG. 4 is a simplified block diagram of one or more components of a system environment 400 by which services provided by one or more components of an embodiment system may be offered as cloud services, in accordance with an embodiment of the present disclosure. In the illustrated embodiment, system environment 400 includes one or more client computing devices 404, 406, and 408 that may be used by users to interact with a cloud infrastructure system 402 that provides cloud services. The client computing devices may be configured to operate a client application such as a web browser, a proprietary client application (e.g., Oracle Forms), or some other application, which may be used by a user of the client computing device to interact with cloud infrastructure system 402 to use services provided by cloud infrastructure system 402.

It should be appreciated that cloud infrastructure system 402 depicted in the figure may have other components than those depicted. Further, the embodiment shown in the figure is only one example of a cloud infrastructure system that may incorporate an embodiment of the disclosure. In some other embodiments, cloud infrastructure system 402 may have more or fewer components than shown in the figure, may combine two or more components, or may have a different configuration or arrangement of components.

Client computing devices 404, 406, and 408 may be devices similar to those described above for 302, 304, 306, and 308.

Although exemplary system environment 400 is shown with three client computing devices, any number of client computing devices may be supported. Other devices such as devices with sensors, etc. may interact with cloud infrastructure system 402.

Network(s) 410 may facilitate communications and exchange of data between clients 404, 406, and 408 and cloud infrastructure system 402. Each network may be any type of network familiar to those skilled in the art that can support data communications using any of a variety of commercially available protocols, including those described above for network(s) 410.

Cloud infrastructure system 402 may comprise one or more computers and/or servers that may include those described above for server 312.

In certain embodiments, services provided by the cloud infrastructure system may include a host of services that are made available to users of the cloud infrastructure system on demand, such as online data storage and backup solutions, Web-based e-mail services, hosted office suites and document collaboration services, database processing, managed technical support services, and the like. Services provided by the cloud infrastructure system can dynamically scale to meet the needs of its users. A specific instantiation of a service provided by cloud infrastructure system is referred to herein as a "service instance." In general, any service made available to a user via a communication network, such as the Internet, from a cloud service provider's system is referred to as a "cloud service." Typically, in a public cloud environment, servers and systems that make up the cloud service provider's system are different from the customer's own on-premises servers and systems. For example, a cloud service provider's system may host an application, and a user may, via a communication network such as the Internet, on demand, order and use the application.

In some examples, a service in a computer network cloud infrastructure may include protected computer network access to storage, a hosted database, a hosted web server, a software application, or other service provided by a cloud vendor to a user, or as otherwise known in the art. For example, a service can include password-protected access to remote storage on the cloud through the Internet. As another example, a service can include a web service-based hosted relational database and a script-language middleware engine for private use by a networked developer. As another example, a service can include access to an email software application hosted on a cloud vendor's web site.

In certain embodiments, cloud infrastructure system 402 may include a suite of applications, middleware, and database service offerings that are delivered to a customer in a self-service, subscription-based, elastically scalable, reliable, highly available, and secure manner. An example of such a cloud infrastructure system is the Oracle Public Cloud provided by the present assignee.

In various embodiments, cloud infrastructure system 402 may be adapted to automatically provision, manage and track a customer's subscription to services offered by cloud infrastructure system 402. Cloud infrastructure system 402 may provide the cloud services via different deployment models. For example, services may be provided under a public cloud model in which cloud infrastructure system 402 is owned by an organization selling cloud services (e.g., owned by Oracle) and the services are made available to the general public or different industry enterprises. As another example, services may be provided under a private cloud model in which cloud infrastructure system 402 is operated solely for a single organization and may provide services for one or more entities within the organization. The cloud services may also be provided under a community cloud model in which cloud infrastructure system 402 and the services provided by cloud infrastructure system 402 are shared by several organizations in a related community. The cloud services may also be provided under a hybrid cloud model, which is a combination of two or more different models.

In some embodiments, the services provided by cloud infrastructure system 430 may include one or more services provided under Software as a Service (SaaS) category, Platform as a Service (PaaS) category, Infrastructure as a Service (IaaS) category, or other categories of services including hybrid services. A customer, via a subscription order, may order one or more services provided by cloud infrastructure system 402. Cloud infrastructure system 402 then performs processing to provide the services in the customer's subscription order.

In some embodiments, the services provided by cloud infrastructure system 402 may include, without limitation, application services, platform services and infrastructure services. In some examples, application services may be provided by the cloud infrastructure system via a SaaS platform. The SaaS platform may be configured to provide cloud services that fall under the SaaS category. For example, the SaaS platform may provide capabilities to build and deliver a suite of on-demand applications on an integrated development and deployment platform. The SaaS platform may manage and control the underlying software and infrastructure for providing the SaaS services. By utilizing the services provided by the SaaS platform, customers can utilize applications executing on the cloud infrastructure system. Customers can acquire the application services without the need for customers to purchase separate licenses and support. Various different SaaS services may be provided. Examples include, without limitation, services that provide solutions for sales performance management, enterprise integration, and flexibility for large organizations.

In some embodiments, platform services may be provided by the cloud infrastructure system via a PaaS platform. The PaaS platform may be configured to provide cloud services that fall under the PaaS category. Examples of platform services may include without limitation services that enable organizations (such as Oracle) to consolidate existing applications on a shared, common architecture, as well as the ability to build new applications that leverage the shared services provided by the platform. The PaaS platform may manage and control the underlying software and infrastructure for providing the PaaS services. Customers can acquire the PaaS services provided by the cloud infrastructure system without the need for customers to purchase separate licenses and support. Examples of platform services include, without limitation, Oracle Java Cloud Service (JCS), Oracle Database Cloud Service (DBCS), and others.

By utilizing the services provided by the PaaS platform, customers can employ programming languages and tools supported by the cloud infrastructure system and also control the deployed services. In some embodiments, platform services provided by the cloud infrastructure system may include database cloud services, middleware cloud services (e.g., Oracle Fusion Middleware services), and Java cloud services. In one embodiment, database cloud services may support shared service deployment models that enable organizations to pool database resources and offer customers a Database as a Service in the form of a database cloud. Middleware cloud services may provide a platform for customers to develop and deploy various cloud applications, and Java cloud services may provide a platform for customers to deploy Java applications, in the cloud infrastructure system.

Various different infrastructure services may be provided by an IaaS platform in the cloud infrastructure system. The infrastructure services facilitate the management and control of the underlying computing resources, such as storage, networks, and other fundamental computing resources for customers utilizing services provided by the SaaS platform and the PaaS platform.

In certain embodiments, cloud infrastructure system 402 may also include infrastructure resources 430 for providing the resources used to provide various services to customers of the cloud infrastructure system. In one embodiment, infrastructure resources 430 may include pre-integrated and optimized combinations of hardware, such as servers, storage, and networking resources to execute the services provided by the PaaS platform and the SaaS platform.

In some embodiments, resources in cloud infrastructure system 402 may be shared by multiple users and dynamically re-allocated per demand. Additionally, resources may be allocated to users in different time zones. For example, cloud infrastructure system 430 may enable a first set of users in a first time zone to utilize resources of the cloud infrastructure system for a specified number of hours and then enable the re-allocation of the same resources to another set of users located in a different time zone, thereby maximizing the utilization of resources.

In certain embodiments, a number of internal shared services 432 may be provided that are shared by different components or modules of cloud infrastructure system 402 and by the services provided by cloud infrastructure system 402. These internal shared services may include, without limitation, a security and identity service, an integration service, an enterprise repository service, an enterprise manager service, a virus scanning and white list service, a high availability, backup and recovery service, service for enabling cloud support, an email service, a notification service, a file transfer service, and the like.

In certain embodiments, cloud infrastructure system 402 may provide comprehensive management of cloud services (e.g., SaaS, PaaS, and IaaS services) in the cloud infrastructure system. In one embodiment, cloud management functionality may include capabilities for provisioning, managing and tracking a customer's subscription received by cloud infrastructure system 402, and the like.

In one embodiment, as depicted in the figure, cloud management functionality may be provided by one or more modules, such as an order management module 420, an order orchestration module 422, an order provisioning module 424, an order management and monitoring module 426, and an identity management module 428. These modules may include or be provided using one or more computers and/or servers, which may be general purpose computers, specialized server computers, server farms, server clusters, or any other appropriate arrangement and/or combination.

In exemplary operation 434, a customer using a client device, such as client device 404, 406 or 408, may interact with cloud infrastructure system 402 by requesting one or more services provided by cloud infrastructure system 402 and placing an order for a subscription for one or more services offered by cloud infrastructure system 402. In certain embodiments, the customer may access a cloud User Interface (UI), cloud UI 412, cloud UI 414 and/or cloud UI 416 and place a subscription order via these UIs. The order information received by cloud infrastructure system 402 in response to the customer placing an order may include information identifying the customer and one or more services offered by the cloud infrastructure system 402 that the customer intends to subscribe to.

After an order has been placed by the customer, the order information is received via the cloud UIs, 412, 414 and/or 416.

At operation 436, the order is stored in order database 418. Order database 418 can be one of several databases operated by cloud infrastructure system and operated in conjunction with other system elements.

At operation 438, the order information is forwarded to an order management module 420. In some instances, order management module 420 may be configured to perform billing and accounting functions related to the order, such as verifying the order, and upon verification, booking the order.

At operation 440, information regarding the order is communicated to an order orchestration module 422. Order orchestration module 422 may utilize the order information to orchestrate the provisioning of services and resources for the order placed by the customer. In some instances, order orchestration module 422 may orchestrate the provisioning of resources to support the subscribed services using the services of order provisioning module 424.

In certain embodiments, order orchestration module 422 enables the management of processes associated with each order and applies logic to determine whether an order should proceed to provisioning. At operation 442, upon receiving an order for a new subscription, order orchestration module 422 sends a request to order provisioning module 424 to allocate resources and configure those resources needed to fulfill the subscription order. Order provisioning module 424 enables the allocation of resources for the services ordered by the customer. Order provisioning module 424 provides a level of abstraction between the cloud services provided by cloud infrastructure system 400 and the physical implementation layer that is used to provision the resources for providing the requested services. Order orchestration module 422 may thus be isolated from implementation details, such as whether or not services and resources are actually provisioned on the fly or pre-provisioned and only allocated/assigned upon request.

At operation 444, once the services and resources are provisioned, a notification of the provided service may be sent to customers on client devices 404, 406 and/or 408 by order provisioning module 424 of cloud infrastructure system 402.

At operation 446, the customer's subscription order may be managed and tracked by an order management and monitoring module 426. In some instances, order management and monitoring module 426 may be configured to collect usage statistics for the services in the subscription order, such as the amount of storage used, the amount data transferred, the number of users, and the amount of system up time and system down time.

In certain embodiments, cloud infrastructure system 400 may include an identity management module 428. Identity management module 428 may be configured to provide identity services, such as access management and authorization services in cloud infrastructure system 400. In some embodiments, identity management module 428 may control information about customers who wish to utilize the services provided by cloud infrastructure system 402. Such information can include information that authenticates the identities of such customers and information that describes which actions those customers are authorized to perform relative to various system resources (e.g., files, directories, applications, communication ports, memory segments, etc.) Identity management module 428 may also include the management of descriptive information about each customer and about how and by whom that descriptive information can be accessed and modified.

FIG. 5 illustrates an exemplary computer system 500, in which various embodiments of the present disclosure may be implemented. The system 500 may be used to implement any of the computer systems described above. As shown in the figure, computer system 500 includes a processing unit 504 that communicates with a number of peripheral subsystems via a bus subsystem 502. These peripheral subsystems may include a processing acceleration unit 506, an input/output (I/O) subsystem 508, a storage subsystem 518 and a communications subsystem 524. Storage subsystem 518 includes tangible computer-readable storage media 522 and a system memory 510.

Bus subsystem 502 provides a mechanism for letting the various components and subsystems of computer system 500 communicate with each other as intended. Although bus subsystem 502 is shown schematically as a single bus, alternative embodiments of the bus subsystem may utilize multiple buses. Bus subsystem 502 may be any of several types of bus structures including a memory bus or memory controller, a peripheral bus, and a local bus using any of a variety of bus architectures. For example, such architectures may include an Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus, which can be implemented as a Mezzanine bus manufactured to the IEEE P1386.1 standard.

Processing unit 504, which can be implemented as one or more integrated circuits (e.g., a conventional microprocessor or microcontroller), controls the operation of computer system 500. One or more processors may be included in processing unit 504. These processors may include single core or multicore processors. In certain embodiments, processing unit 504 may be implemented as one or more independent processing units 532 and/or 534 with single or multicore processors included in each processing unit. In other embodiments, processing unit 504 may also be implemented as a quad-core processing unit formed by integrating two dual-core processors into a single chip.

In various embodiments, processing unit 504 can execute a variety of programs in response to program code and can maintain multiple concurrently executing programs or processes. At any given time, some or all of the program code to be executed can be resident in processing unit 504 and/or in storage subsystem 518. Through suitable programming, processing unit 504 can provide various functionalities described above. Computer system 500 may additionally include a processing acceleration unit 506, which can include a digital signal processor (DSP), a special-purpose processor, and/or the like.

I/O subsystem 508 may include user interface input devices and user interface output devices. User interface input devices may include a keyboard, pointing devices such as a mouse or trackball, a touchpad or touch screen incorporated into a display, a scroll wheel, a click wheel, a dial, a button, a switch, a keypad, audio input devices with voice command recognition systems, microphones, and other types of input devices. User interface input devices may include, for example, motion sensing and/or gesture recognition devices such as the Microsoft Kinect® motion sensor that enables users to control and interact with an input device, such as the Microsoft Xbox® 360 game controller, through a natural user interface using gestures and spoken commands. User interface input devices may also include eye gesture recognition devices such as the Google Glass® blink detector that detects eye activity (e.g., 'blinking' while taking pictures and/or making a menu selection) from users and transforms the eye gestures as input into an input device (e.g., Google Glass®). Additionally, user interface input devices may include voice recognition sensing devices that enable users to interact with voice recognition systems (e.g., Siri® navigator), through voice commands.

User interface input devices may also include, without limitation, three dimensional (3D) mice, joysticks or pointing sticks, gamepads and graphic tablets, and audio/visual devices such as speakers, digital cameras, digital camcorders, portable media players, webcams, image scanners, fingerprint scanners, barcode reader 3D scanners, 3D printers, laser rangefinders, and eye gaze tracking devices. Additionally, user interface input devices may include, for example, medical imaging input devices such as computed tomography, magnetic resonance imaging, position emission tomography, medical ultrasonography devices. User interface input devices may also include, for example, audio input devices such as musical interface digital interface (MIDI) keyboards, digital musical instruments and the like.

User interface output devices may include a display subsystem, indicator lights, or non-visual displays such as audio output devices, etc. The display subsystem may be a cathode ray tube (CRT), a flat-panel device, such as that using a liquid crystal display (LCD) or plasma display, a projection device, a touch screen, and the like. In general, use of the term "output device" is intended to include all possible types of devices and mechanisms for outputting information from computer system 500 to a user or other computer. For example, user interface output devices may include, without limitation, a variety of display devices that visually convey text, graphics and audio/video information such as monitors, printers, speakers, headphones, automotive navigation systems, plotters, voice output devices, and modems.

Computer system 500 may comprise a storage subsystem 518 that comprises software elements, shown as being currently located within a system memory 510. System memory 510 may store program instructions that are loadable and executable on processing unit 504, as well as data generated during the execution of these programs.

Depending on the configuration and type of computer system 500, system memory 510 may be volatile (such as random access memory (RAM)) and/or non-volatile (such as read-only memory (ROM), flash memory, etc.) The RAM typically contains data and/or program modules that are immediately accessible to and/or presently being operated and executed by processing unit 504. In some implementations, system memory 510 may include multiple different types of memory, such as static random access memory (SRAM) or dynamic random access memory (DRAM). In some implementations, a basic input/output system (BIOS), containing the basic routines that help to transfer information between elements within computer system 500, such as during start-up, may typically be stored in the ROM. By way of example, and not limitation, system memory 510 also illustrates application programs 512, which may include client applications, Web browsers, mid-tier applications, relational database management systems (RDBMS), etc., program data 514, and an operating system 516. By way of example, operating system 516 may include various versions of Microsoft Windows®, Apple Macintosh®, and/or Linux operating systems, a variety of commercially-available UNIX® or UNIX-like operating systems (including without limitation the variety of GNU/Linux operating systems, the Google Chrome® OS, and the like) and/or mobile operating systems such as iOS, Windows® Phone, Android® OS, BlackBerry® 10 OS, and Palm® OS operating systems.

Storage subsystem 518 may also provide a tangible computer-readable storage medium for storing the basic programming and data constructs that provide the functionality of some embodiments. Software (programs, code modules, instructions) that when executed by a processor provide the functionality described above may be stored in storage subsystem 518. These software modules or instructions may be executed by processing unit 504. Storage subsystem 518 may also provide a repository for storing data used in accordance with the present disclosure.

Storage subsystem 518 may also include a computer-readable storage media reader 520 that can further be connected to computer-readable storage media 522. Together and, optionally, in combination with system memory 510, computer-readable storage media 522 may comprehensively represent remote, local, fixed, and/or removable storage devices plus storage media for temporarily and/or more permanently containing, storing, transmitting, and retrieving computer-readable information.

Computer-readable storage media 522 containing code, or portions of code, can also include any appropriate media known or used in the art, including storage media and communication media, such as but not limited to, volatile and non-volatile, removable and non-removable media implemented in any method or technology for storage and/or transmission of information. This can include tangible computer-readable storage media such as RAM, ROM, electronically erasable programmable ROM (EEPROM), flash memory or other memory technology, compact disc-read-only memory (CD-ROM), digital versatile disk (DVD), or other optical storage, magnetic cassettes, magnetic tape, magnetic disk storage or other magnetic storage devices, or other tangible computer readable media. This can also include nontangible computer-readable media, such as data signals, data transmissions, or any other medium which can be used to transmit the desired information and which can be accessed by computing system 500.

By way of example, computer-readable storage media 522 may include a hard disk drive that reads from or writes to non-removable, nonvolatile magnetic media, a magnetic disk drive that reads from or writes to a removable, non-volatile magnetic disk, and an optical disk drive that reads from or writes to a removable, nonvolatile optical disk such as a CD ROM, DVD, and Blu-Ray® disk, or other optical media. Computer-readable storage media 522 may include, but is not limited to, Zip® drives, flash memory cards, universal serial bus (USB) flash drives, secure digital (SD) cards, DVD disks, digital video tape, and the like. Computer-readable storage media 522 may also include, solid-state drives (SSD) based on non-volatile memory such as flash-memory based SSDs, enterprise flash drives, solid state ROM, and the like, SSDs based on volatile memory such as solid state RAM, dynamic RAM, static RAM, dynamic random access memory (DRAM)-based SSDs, magnetoresistive RAM (MRAM) SSDs, and hybrid SSDs that use a combination of DRAM and flash memory based SSDs. The disk drives and their associated computer-readable media may provide non-volatile storage of computer-readable instructions, data structures, program modules, and other data for computer system 500.

Communications subsystem 524 provides an interface to other computer systems and networks. Communications subsystem 524 serves as an interface for receiving data from and transmitting data to other systems from computer system 500. For example, communications subsystem 524 may enable computer system 500 to connect to one or more devices via the Internet. In some embodiments communications subsystem 524 can include radio frequency (RF) transceiver components for accessing wireless voice and/or data networks (e.g., using cellular telephone technology, advanced data network technology, such as 3G, 4G or EDGE (enhanced data rates for global evolution), Wi-Fi (IEEE 1202.11 family standards, or other mobile communication technologies, or any combination thereof), global positioning system (GPS) receiver components, and/or other components. In some embodiments communications subsystem 524 can provide wired network connectivity (e.g., Ethernet) in addition to or instead of a wireless interface.

In some embodiments, communications subsystem 524 may also receive input communication in the form of structured and/or unstructured data feeds 526, event streams 528, event updates 530, and the like on behalf of one or more users who may use computer system 500.

By way of example, communications subsystem 524 may be configured to receive data feeds 526 in real-time from users of social networks and/or other communication services such as Twitter® feeds, Facebook® updates, web feeds such as Rich Site Summary (RSS) feeds, and/or real-time updates from one or more third party information sources.

Additionally, communications subsystem 524 may also be configured to receive data in the form of continuous data streams, which may include event streams 528 of real-time events and/or event updates 530, that may be continuous or unbounded in nature with no explicit end. Examples of applications that generate continuous data may include, for example, sensor data applications, financial tickers, network performance measuring tools (e.g. network monitoring and traffic management applications), clickstream analysis tools, automobile traffic monitoring, and the like.

Communications subsystem 524 may also be configured to output the structured and/or unstructured data feeds 526, event streams 528, event updates 530, and the like to one or more databases that may be in communication with one or more streaming data source computers coupled to computer system 500.

Computer system 500 can be one of various types, including a handheld portable device (e.g., an iPhone® cellular phone, an iPad® computing tablet, a PDA), a wearable device (e.g., a Google Glass® head mounted display), a PC, a workstation, a mainframe, a kiosk, a server rack, or any other data processing system.

Due to the ever-changing nature of computers and networks, the description of computer system 500 depicted in the figure is intended only as a specific example. Many other configurations having more or fewer components than the system depicted in the figure are possible. For example, customized hardware might also be used and/or particular elements might be implemented in hardware, firmware, software (including applets), or a combination. Further, connection to other computing devices, such as network input/output devices, may be employed. Based on the disclosure and teachings provided herein, a person of ordinary skill in the art will appreciate other ways and/or methods to implement the various embodiments.

In the foregoing specification, aspects of the disclosure are described with reference to specific embodiments thereof, but those skilled in the art will recognize that the disclosure is not limited thereto. Various features and aspects of the above-described disclosure may be used individually or jointly. Further, embodiments can be utilized in any number of environments and applications beyond those described herein without departing from the broader spirit and scope of the specification. The specification and drawings are, accordingly, to be regarded as illustrative rather than restrictive.

What is claimed is:

1. A method performed by a server system for receiving tenant data in which a machine-learning model is associated therewith, the method comprising:
   authorizing a tenant system to communicate with the server system;
   loading the machine-learning model associated with the tenant system;
   receiving data from the tenant system, wherein the data is to configure the machine-learning model, wherein the data comprises one or more library components including at least one of a pipeline, a microservice routine, a software module, or an infrastructure model, and wherein the one or more library components are encrypted with key;
   authenticating the data in accordance with the key;
   discarding the data if the authentication fails; and configuring the machine-learning model with the data if the authentication succeeds.

2. The method of claim 1, wherein the key for each library component of the one or more library components is unique.

3. The method of claim 1, wherein the library components are stored at a first location, and the key is stored at a second location, and wherein the first location is different from the second location.

4. The method of claim 1, further comprising:
compiling the library components into machine-learning software; and encrypting the machine-learning software using a second set of encryption keys.

5. The method of claim 1, wherein the data further comprises an encrypted uncustomized library component.

6. The method of claim 1, wherein the one library component comprises the pipeline.

7. The method of claim 1, wherein the one library component comprises the microservice routine.

8. A server system to receive tenant data in which a machine-learning model is associated therewith, comprising:
one or more memories storing instructions; and
one or more processors communicatively coupled to the one or more memories to execute instructions to cause the one or more processors to:
authorize a tenant system to communicate with the server system;
load the machine-learning model associated with the tenant system;
receive data from the tenant system, wherein the instructions are executable to cause the data to configure the machine-learning model, wherein the data comprises one or more library components including at least one of a pipeline, a microservice routine, a software module, or an infrastructure model, and wherein the one or more library components are previously encrypted with a key;
authenticate the data in accordance with the key;
discard the data if the authentication fails; and
configure the machine-learning model with the data if the authentication succeeds.

9. The server system of claim 8, wherein the key for each library component of the one or more library components is unique.

10. The server system of claim 8, wherein the library components are stored at a first location, and the key is stored at a second location, wherein the first location is different from the second location.

11. The server system of claim 8, wherein the instructions are executable to further cause the one or more processors to:

compile the library components into machine-learning software; and
encrypt the machine-learning software using a second set of encryption keys.

12. The server system of claim 8, wherein the data comprises an encrypted uncustomized library component.

13. The server system of claim 8, wherein the one library component comprises the pipeline.

14. The server system of claim 8, wherein the one library component comprises the microservice routine.

15. An article comprising: a non-transitory computer-readable medium with instructions stored thereon, the instructions comprising:
one or more instructions executable by one or more processors to cause the one or more processors to:
authorize a tenant system to communicate with a server system that includes the one or more processors;
load the machine-learning model associated with the tenant system;
receive data from the tenant system, wherein the instructions are executable to cause the data to configure the machine-learning model, wherein the data from the tenant system is to comprise one or more library components previously encrypted with a key, including at least one of a pipeline, a microservice routine, a software module, or an infrastructure model is;
authenticate the data in accordance with the key;
discard the data if the authentication fails; and
configure the machine-learning model with the data if the authentication succeeds.

16. The article of claim 15, wherein the key for each library component of the one or more library components is unique.

17. The article of claim 15, wherein the library components are stored at a first location, and the key is stored at a second location, wherein the first location is different from the second location.

18. The article of claim 15, wherein the one or more instructions are further executable to cause the one or more processors to:
compile the library components into machine-learning software; and
encrypt the machine-learning software using a second set of encryption keys.

19. The article of claim 15, wherein the one library component comprises the pipeline.

20. The article of claim 15, wherein the one library component comprises the microservice routine.

* * * * *

UNITED STATES PATENT AND TRADEMARK OFFICE
CERTIFICATE OF CORRECTION

PATENT NO. : 11,811,925 B2
APPLICATION NO. : 17/019256
DATED : November 7, 2023
INVENTOR(S) : Polleri et al.

It is certified that error appears in the above-identified patent and that said Letters Patent is hereby corrected as shown below:

On the Title Page

Column 2, under Other Publications, Line 1, delete "Allow ance" and insert -- Allowance --, therefor.

On page 3, Column 1, under Other Publications, Line 12, delete "H20" and insert -- H2O --, therefor.

On page 3, Column 1, under Other Publications, Line 13, delete "h2o- driverless" and insert -- h2o-driverless --, therefor.

On page 3, Column 1, under Other Publications, Line 15, delete "MIbox's" and insert -- Mlbox's --, therefor.

On page 3, Column 1, under Other Publications, Line 44, delete "Atomated" and insert -- Automated --, therefor.

In the Specification

In Column 8, Line 35, delete "etc.)" and insert -- etc.). --, therefor.

In Column 13, Line 14, delete "Internet" and insert -- Internetwork --, therefor.

In Column 21, Line 52, delete "evolution)," and insert -- evolution)), --, therefor.

In the Claims

In Column 22, Line 65, in Claim 1, delete "with" and insert -- with a --, therefor.

In Column 24, Line 27, in Claim 15, delete "is;" and insert -- ; --, therefor.

Signed and Sealed this
Eleventh Day of June, 2024

Katherine Kelly Vidal
*Director of the United States Patent and Trademark Office*